UNITED STATES PATENT OFFICE.

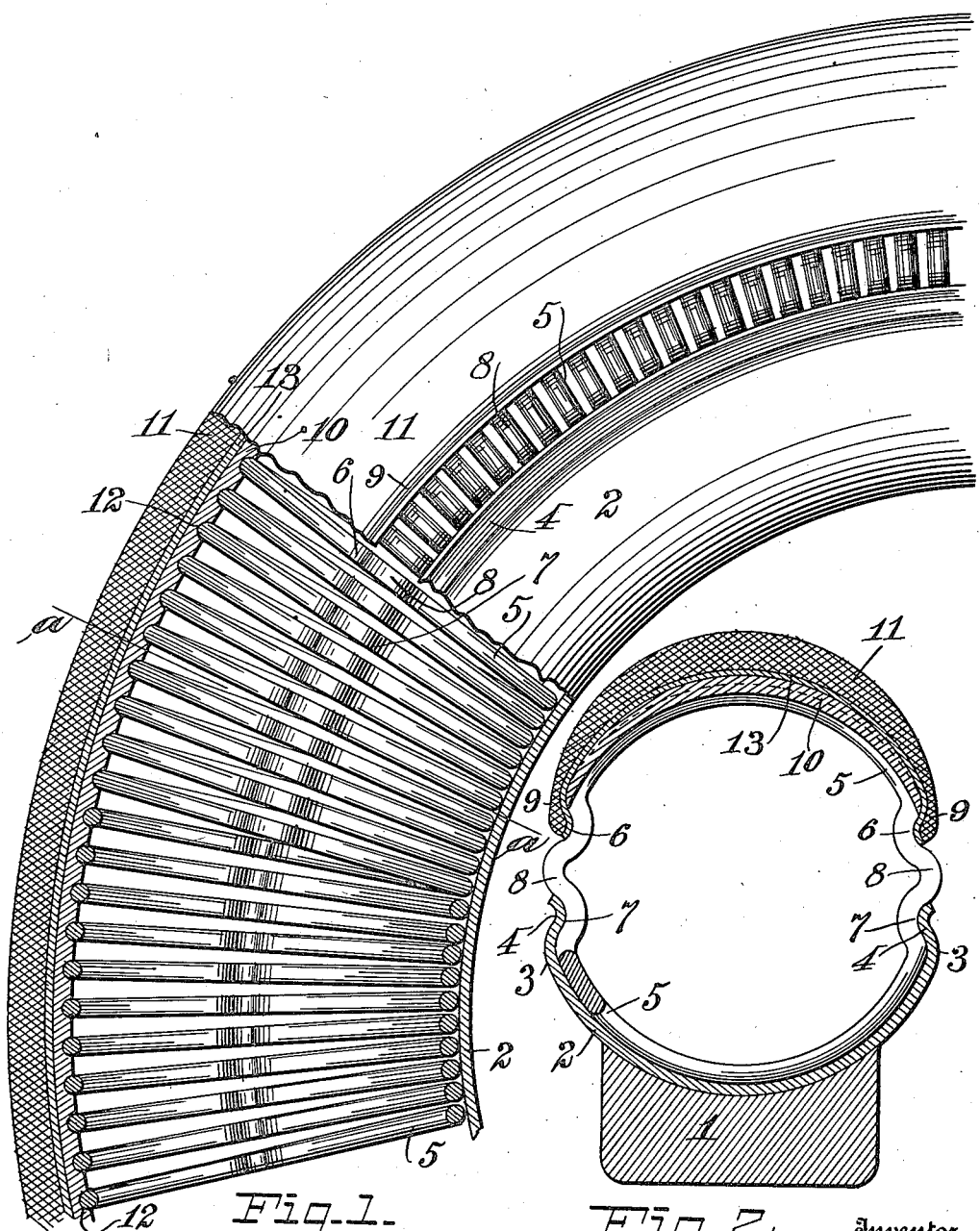

ROY B. SHOOK, OF DAYTON, OHIO.

RESILIENT WHEEL.

1,146,289.   Specification of Letters Patent.   Patented July 13, 1915.

Application filed March 6, 1915. Serial No. 12,499.

*To all whom it may concern:*

Be it known that I, ROY B. SHOOK, a citizen of the United States, residing at Dayton, in the county of Montgomery and State of Ohio, have invented certain new and useful Improvements in Resilient Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in vehicle wheels and more particularly to wheels of a resilient character.

The object of the invention is to provide a resilient wheel of comparatively few parts and which has the element of resiliency to a desirable extent and avoids the liability to damage which is so common to pneumatic wheels.

Referring to the accompanying drawings, Figure 1 is an elevation of a portion of the wheel a part of which is shown in section; Fig. 2 is a cross-section on the line $a$—$a$ of Fig. 1.

In a detail description of my invention, similar reference characters indicate corresponding parts both in the description and drawings.

Well known parts of the wheel structure have been omitted from the drawings such, for example, as the wheel hub, spokes, etc. The present improvements relate solely to the wheel tire; it has, therefore, been deemed unnecessary to illustrate other parts.

Beginning with the felly or wheel rim 1, there is nothing special or uncommon in the structure of this. The inner holding rim 2, however, departs from the well known forms of clencher rims in that its margins 3 are crimped to provide two inner curved shoulders 4 which run throughout the circumference of the said rim on both sides. The said rim 2 is secured to the felly 1 in the usual manner. The tire of the wheel is placed in this annular channel rim 2 and consists of an annular resilient member formed of a coil spring 5 the ends of which are united to form a continuous ring. Owing to the spring from which the tire is formed having certain structural features, which will be presently described, the spring is irregular in cross-section. This is so because the convolutions do not form complete circles. The convolutions of the spring are uniform throughout and the gage of wire from which the spring is made is suitable for the character of the wheel. For example, in truck wheels or wheels for heavy draft vehicles it would necessarily be of larger gage of wire than that required for wheels of lighter draft. On opposite sides of the spring tire thus formed it is provided with two annular channels 6 and 7 between which annular bulged portions 8 lie. The inner annular channels 7 receive the annular shoulders 4 on the margins of the rim 2. The spring 5 is thus held securely within the channel rim 2, it being understood that the shoulders and recesses 4 and 7 extend entirely around the tire.

The outer casing or tread of the wheel or that portion which incloses the outer circumference of the spring tire 5 is constructed in one homogeneous part the elements of which consist of a curved annular steel channel ring 13 the margins 9 of which are crimped and enter the outer circumferential channels 6 of the spring tire. United to the inner surface of the member 13 is a sheathing 10 of suitable metal such, for example, as babbitt, and to the outer side of said member 13 a covering is united consisting of a suitable fabric 11 constructed of a combination of rubber and canvas or other material which is usually employed for the outer casings of wheels. The crimped margins 9 of the casing fit snugly in the channels 6 and the said casing thus becomes firmly united to the spring tire. The inner surface of said casing, which, as before stated, is the metal portion 10, is provided with a series of transverse grooves 12 throughout its circumference which receive the outer portions of the convolutions of the spring tire and serve to maintain said spring tire and the casing in suitable connection throughout the circumference of the wheel. The part of the inner metal portion 10 of the casing which lies between the convolutions of the spring forms a shoulder between each convolution, which shoulders maintain the convolutions in position throughout the circumference of the wheel. The circumferential oppositely disposed bulged portions 8 of the spring tire form abutments between the margins of the inner rim 2 and the other casing such abutments being instrumental in contributing to the maintenance of the spring tire and outer casing in position.

Having described my invention, I claim—

1. A resilient vehicle wheel, comprising an endless irregular coil spring, a channel rim inclosing the inner circumference thereof, the margins of said rim having a holding contact with opposite sides of said spring, and a casing inclosing the outer circumference of said spring and the margins of which have a holding contact with the opposite sides of said spring, substantially as described.

2. A wheel of the character specified, comprising an endless coil spring opposite sides of which have annular offsets, a channel rim inclosing the inner circumference of said spring and the margins of which engage said spring below the annular offsets, and a casing inclosing the outer circumference of said spring and the margins of which engage said spring above said annular offsets, substantially as described.

3. In a vehicle wheel, the combination of an annular coil spring having two series of oppositely disposed uniform indentations in the convolutions thereof, a channel rim inclosing the inner circumference of said spring and the annular margins of which engage the innermost series of said indentations and whereby said spring is held to said channel rim, and a tread casing inclosing the outer circumference of said spring and the annular margins of which engage the outermost series of indentations and whereby said casing is united to said spring, substantially as described.

In testimony whereof I affix my signature, in presence of two witnesses.

ROY B. SHOOK.

Witnesses:
R. J. McCarty,
M. Siebler.